United States Patent [19]

Alberts et al.

[11] Patent Number: 5,064,169

[45] Date of Patent: Nov. 12, 1991

[54] SHOCK ABSORBING MEANS FOR FLOW CONTROL DEVICES

[75] Inventors: Jack B. Alberts; Michael D. McNeely, both of Houston, Tex.

[73] Assignee: Keystone International Holdings Corp.

[21] Appl. No.: 643,485

[22] Filed: Jan. 22, 1991

Related U.S. Application Data

[63] Continuation-in-part of Ser. No. 502,047, Mar. 30, 1990, Pat. No. 5,011,116.

[51] Int. Cl.⁵ .................... F16K 25/00; F16K 31/102; F16K 17/04
[52] U.S. Cl. ..................................... 251/334; 137/469; 137/488; 137/904; 251/362
[58] Field of Search ............ 137/469, 474, 488, 489.5; 251/333, 334, 360, 361, 362, 363, 364, 365, 84, 85

[56] References Cited

U.S. PATENT DOCUMENTS

| | | | |
|---|---|---|---|
| 452,357 | 5/1891 | Bavier | 251/365 |
| 820,154 | 5/1906 | Towne | |
| 1,654,516 | 12/1927 | Wilson | |
| 1,671,140 | 5/1928 | Wilson | |
| 1,679,779 | 8/1928 | Oberhuber | |
| 1,800,127 | 4/1931 | Wilson | |
| 1,847,385 | 3/1932 | Dengler | |
| 1,878,222 | 9/1932 | Wilson | |
| 2,163,472 | 6/1939 | Shimer | |
| 2,398,370 | 4/1946 | Gentzel | 251/365 |
| 2,597,474 | 5/1952 | Griffith | 251/364 |
| 2,643,671 | 6/1953 | Dayton | |
| 3,063,467 | 11/1962 | Roberts, Jr. et al. | |
| 3,430,646 | 3/1969 | Vick | |
| 3,433,250 | 3/1969 | Hagihara | |
| 3,702,141 | 11/1972 | Wetterhorn | |
| 3,785,029 | 1/1974 | McClellan et al. | 251/365 |
| 4,188,013 | 2/1980 | Battersby et al. | |
| 4,296,307 | 10/1981 | Hagihara | |
| 4,858,642 | 8/1989 | Fain, Jr. | |

FOREIGN PATENT DOCUMENTS 0859738 9/1981 U.S.S.R. ................ 251/365

Primary Examiner—George L. Walton
Attorney, Agent, or Firm—Dodge, Bush, Moseley & Riddle

[57] ABSTRACT

A pressure relief valve (14, 14A) has a reciprocable valve member (34, 34A) for seating on an annular seat face (66,66A) of a nozzle assembly (38,38A). The nozzle assembly (38,38A) has an inner seat ring (40,40A), a radially outer anchor ring (42,42A), and a flexible connecting member (44,44A) extending in a generally radial direction between the outer peripheral surface (64) of the seat ring (40,40A) and the inner peripheral surface of the anchor ring (42,42A). Upon seating or reseating of the valve member, (34,34A), seal face (36,36A) contacts the seat face (66,66A) of seat ring (40,40A) and flexible connecting member (44,44A) flexes upon relative movement of the seat ring (40,40A) after initial contact of the valve member (34,34A) against the seating ring (40,40A) thereby to act as a shock absorber for absorbing impact forces.

16 Claims, 3 Drawing Sheets

SHOCK ABSORBING MEANS FOR FLOW CONTROL DEVICES

CROSS REFERENCE TO RELATED APPLICATION

This application is a continuation-in-part of application Ser. No. 502,047 filed Mar. 30, 1990 and entitled "Shock Absorbing Sealing Means For Flow Control Devices", now U.S. Pat. No. 5,011,116.

BACKGROUND OF THE INVENTION

This invention relates to shock absorbing means for flow control devices, and more particularly to shock absorbing means for reciprocable flow control members of flow control devices such as valves.

Heretofore, such as shown in U.S. Pat. No. 3,433,250 dated Mar. 18, 1969, safety relief valves have been provided with means to absorb at least some of the impact forces upon reseating of a reciprocable valve member. However, upon reseating of the valve member, substantial radial deflection may occur after initial line contact of the valve sealing face with the fixed seat ring. Such radial deflection is undesirable and oftentimes results in undue wear and possible damage to the contacting faces.

Also, shock absorbing sealing means for flow control devices such as valves, have utilized elastomeric members for absorbing shock. For example, U.S. Pat. No. 4,858,642 dated Aug. 22, 1989 shows a pressure operated relief valve in which an elastomeric member is positioned between a valve disc and a disc holder to absorb shock forces upon reseating of the valve member resulting from a reduction in pressure after actuation of the valve member. Elastomeric members are subject to deterioration at high temperatures, such as temperatures over around 500 F for example.

Other impact type valves have utilized fluid metering for absorbing shock force upon impact of the valve member against a valve seat or for reducing the speed of movement of the valve member prior to impact thereby to minimize impact forces. Such fluid metering arrangements are costly, relatively complex, and do not usually absorb all of the impact forces.

SUMMARY OF THE INVENTION

Prior application Ser. No. 502,047 filed Mar. 30, 1990 shows a shock absorbing sealing means for reciprocable flow control members of flow control devices such as valves. The specific embodiments illustrated in application Ser. No. 502,047 are directed to such shock absorbing means in which the shock absorbing member is mounted on and carried by the reciprocable valve member with the shock absorbing member flexing or deflecting upon contact of the valve member with a fixed seat ring thereby to absorb the impact forces.

The present invention provides a shock absorbing sealing means for reciprocable flow control members, such as valves, in which the shock absorbing member is mounted on the annular seat or nozzle against which the reciprocable flow control member seats. The reciprocable flow control member normally comprises a reciprocable valve member in a pressure relief valve, for example, and upon unseating of the valve member at a predetermined high fluid pressure, the valve member oftentimes reseats with an impact force exerted against the seat. To minimize wear, damage, leakage, and the like to impacting members, it is desirable that the impact forces or energy generated by impact be dissipated or absorbed with minimal radial deflection between contacting faces of the seat ring and reciprocable valve member. The seat assembly of the present invention defines a nozzle or seat ring extending about a flow passage and a flexible connecting member extends outwardly from the seat ring to means anchoring the seat ring. The flexible connecting member permits by flexure thereof upon impact of the valve member against the seat ring a cushioned longitudinal movement of the reciprocable valve member after contact with the metal seat ring thereby to absorb impact forces. Bending movements are exerted at the hinging or joining of opposite ends of the flexible connecting member between the anchoring means and the metal seal ring of the seat assembly. Thus, the size of the flexible connecting member and the seat ring may be determined depending on the specifications and operating parameters for the valve structure.

It is an object of this invention to provide shock absorbing means for a high temperature flow control device having a reciprocable flow control member movable along a longitudinal axis and seating against a flexible seat ring.

It is a further object of this invention to provide shock absorbing means for such a flow control device including a seat ring defining a nozzle extending about a flow passage and connected to a generally radially extending flexible connection which flexes upon contact of the reciprocable flow control member for absorbing impact forces.

An additional object of this invention is to provide shock absorbing means for a safety relief valve seated in closed position on a nozzle about the flow passage with a generally radially extending flexible member connected to the nozzle for absorbing impact forces upon impact of the relief valve member against the nozzle.

Other objects, features, and advantages of the invention will be in part and in part pointed out hereinafter.

DESCRIPTION OF THE INVENTION

Figures 1, 2:
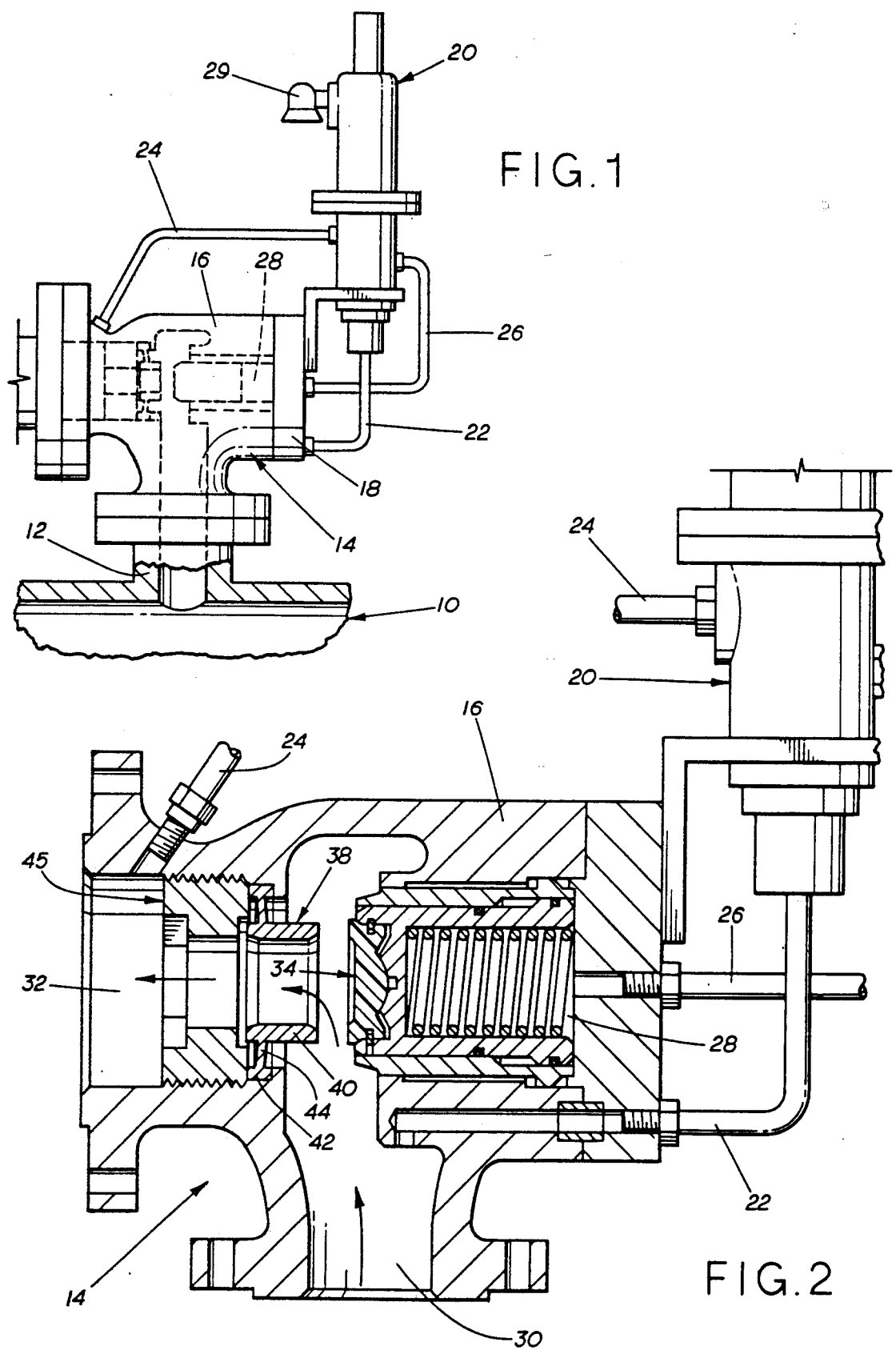
FIG. 1 is a schematic view of a safety relief system illustrating a main relief valve and associated pilot valve positioned on a pressure vessel for utilizing the present invention.
FIG. 2 is an enlarged cross section of the pilot operated pressure relief valve shown in FIG. 1 with the reciprocable valve member shown in an open position to permit fluid flow through the valve for relieving fluid pressure and adapted for reseating against the nozzle ring about the flow passage.

Referring now to the drawings for a better understanding of this invention and more particularly to FIG. 1 in which a safety relief system is shown illustrating a use of the present invention, a pressure vessel or tank is shown generally at 10 having an outlet 12 extending therefrom. A main relief valve is indicated generally at 14 and has a main body 16 with a cap or cover 18 secured thereto. A pilot valve generally indicated at 20 is mounted on relief valve 14. An inlet line 22 extends from main valve 14 to pilot valve 20 and an outlet line 24 extends from pilot valve 20 to the downstream side of body 16. A control fluid line 26 extends from pilot valve 20 to a dome or dome chamber 28 of main relief valve 14. The pressure release system illustrated is particularly adapted for high temperature over around 350 F and may be utilized with steam, liquid, or vapor with various types of pressure vessels or fluid flow lines extending to main relief valve 14. An exhaust 29 provides a vent to atmosphere for pilot valve 20.

Valve body 16 defines an inlet flow passage at 30 and an outlet flow passage at 32. A fluid operated reciprocable valve member is generally indicated at 34 having dome chamber 28 therein and mounted for reciprocable movement between open and closed positions. Valve member 34 moves to an open position as shown in FIG. 2 resulting from a predetermined high fluid pressure being reached in pressure vessel 10 and inlet passage 30 sensed by pilot line 22. Upon a reduction in fluid pressure in pressure vessel 10 and inlet passage 30 as sensed by pilot valve 20, valve member 34 reseats on nozzle assembly 38. Oftentimes, even with dampening of the movement of valve member 34, and particularly upon a relative fast reduction in fluid pressure in inlet passage 30 after opening, valve member 34 moves rapidly to closed seated position to exert impact forces against nozzle assembly 38. Impact forces may cause abnormal wear or damage which could result in fluid leakage in the closed position of valve member 34. An annular seal face 36 is provided on the end of reciprocable valve member 34 and has a width indicated at T1.

A nozzle assembly or seat ring assembly generally indicated at 38 forms an important part of this invention and is mounted about flow passage 32. Nozzle assembly 38 includes an inner nozzle or seat ring indicated at 40, an outer securing or anchoring ring indicated at 42, and a flexible connecting member 44 extending in a generally radial direction between seat ring 40 and anchor ring 42. For securing or mounting nozzle assembly 38 a sleeve generally indicated at 45 has an inner periphery 46 defining flow passage 32 and a threaded outer periphery 48. The inner annular end 50 of sleeve 45 has an annular recess defining a shoulder 52 and an outer peripheral surface 54. Body 16 is internally threaded at 55 and has an inner flange or overhanging lip 56 spaced in opposed relation to annular end 50 to define a receiving groove therebetween. Anchor ring 42 of nozzle assembly 38 has opposed ends 58 and sealing gaskets 60 which are gripped between lip 56 and end 50 upon threading of sleeve 45 within body 16 tightly against anchor ring 42.

Nozzle or seat ring 40 has an inner peripheral surface 62 and an outer peripheral surface 64 which are spaced radially from each other. The center of gravity of seat ring 40 is shown at 65. The upper annular end 66 of seat ring 40 defines a seating face having a width W2 for contacting and sealing against face 36 of valve member 34 which has a width T1. The lower annular end 68 of seat ring 40 is received within the inner recess of sleeve 45 and may contact shoulder 52 to restrict axial movement of ring 40 and overstressing of seat assembly 38 upon impact loads from valve member 34 as will be explained further below.

Flexible connecting member 44 extends in a generally radial direction between seat ring 40 and anchor ring 42. Connecting member 44 is hinged to the inner peripheral surface of outer ring 42 about point 72 and hinged to the outer peripheral surface 64 of seat ring 40 at point 74. Flexible connecting member 44 flexes after initial contact of sealing face 36 on valve member 34 with face 66 of seat ring 40 and is constructed and arranged for a predetermined flexure relative to anchor ring 42 for absorbing impact forces with minimal radial and angular deflections of sealing face 66 on seat ring 40 and for providing alignment between faces 36 and 66.

Figure 3:
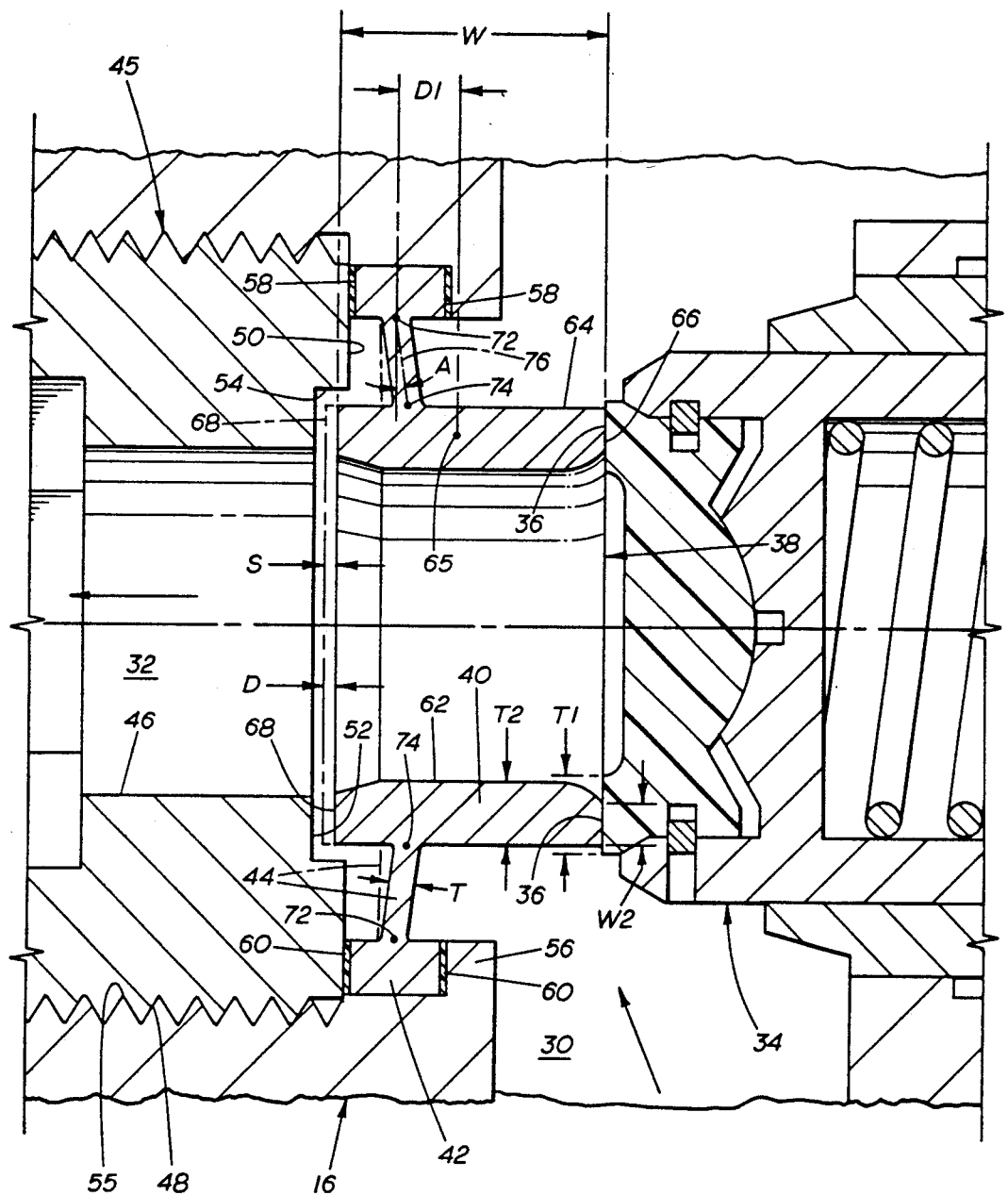
FIG. 3 is an enlarged fragment of FIG. 2 illustrating particularly the sizing of the members forming the shock absorbing sealing means of the present invention and showing in broken lines the movement of the nozzle ring upon flexing of the flexible member connected to the nozzle ring after impact of the valve member against the nozzle ring.

As shown in FIG. 3, seat ring 40 of nozzle assembly 38 moves an axial distance D after contact of seal face 36 with seat face 66. Distance D is at least greater than around 0.002 inch and may be as high as around 0.030 inch or greater depending primarily on such factors as the size of valve member 34 and various operating parameters. Planar rear face 68 of seat ring 40 is normally spaced from shoulder 52 and shoulder 52 acts as a stop when contacted by rear face 68 to limit the maximum travel S of seat ring 40 past the elastic limit of connecting member 44 after seat face 66 is contacted by seal face 36. The longitudinal axis of flexible connecting member 44 is shown at 76. The thickness of connecting member 44 is indicated at T.

Seat ring 40 has a maximum thickness indicated at T2, and a width indicated at W. The center of gravity of seat ring 40 indicated at 65 is offset an axial distance D1 from the centerline of connecting member 44 at hinge point 72 in a direction toward or longitudinally inwardly of seat face 66. Such an offset has been found desirable in order to minimize any angular or radial deflection of seat face 66 upon flexing of connecting member 44 resulting from movement of seat ring 40 after seal face 36 contacts seat face 66. An offset distance D1 of at least around 0.050 inch is believed desirable in order to minimize the deflection of seat face 66 to an insignificant amount.

Further, in order for the flexing of connecting member 44 to maintain alignment of seat face 66 against seal face 36 upon impacting of valve member 34 against seat ring 40, it is desirable that the maximum thickness T1 of seat ring 40 be at least around twice the thickness T of connecting member 44. Further, it is desirable that the width W of seat ring 40 be at least around three times the thickness T of connecting member 44. Additionally, in order to minimize the angular and radial deflections of face 66 upon flexure of connecting member 44, the longitudinal axis 76 of connecting member 44 slopes toward the center of gravity 65 from hinge point 72 at the inner peripheral surface of outer ring 42 at a positive slope angle shown at angle A in FIG. 3. It is believed that angle A should be between around onehalf degree and ten degrees in order to obtain optimum results. It is noted that the center of gravity 65 is positioned between valve member 34 and connecting member 44 in the embodiment of FIGS. 1-3. It is to be understood that in the event connecting member 44 is positioned between valve member 34 and the center of gravity, connecting member 44 will slope in an opposite direction at a negative slope angle.

Planar face 36 is of a width T1 greater than the width W2 of planar face 66 for the most effective sealing action and with minimal radial and angular deflections occurring after contact. Such an arrangement accommodates any lack of concentricity between faces 36 and 66. Seal face 36 is formed of a harder face material than is seat face 66.

It is apparent from the above that the design of the flexible connecting member 44 between seat ring 40 and anchor ring 42 may be predetermined in order to have sufficient flexure to absorb the impact forces while minimizing the deflection of seat face 66. While anchor ring 42, connecting member 44, and seat ring 40 are shown as an integral construction in seat assembly 38, it is to be understood that connecting member 44 may be formed of a separate member, if desired, such as a Belleville washer, for example.

While metal is a preferred material from which the present invention is formed, it is to be understood that other hard material resistant to high temperature, such as certain types of ceramic and composite materials, may be utilized in a satisfactory manner. The term "hard" as used in the specification and claims herein is interpreted as being "non-elastomeric".

Figure 4:
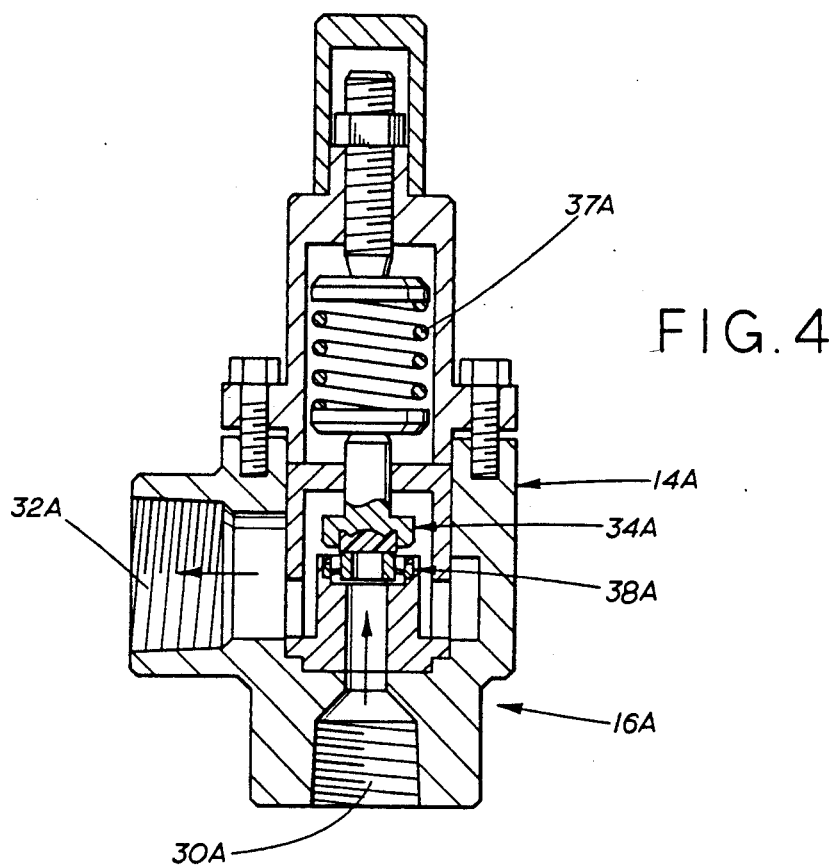
FIG. 4 is a cross section of another embodiment of the present invention showing a non-pilot operated pressure relief valve in closed position seated on the flexible nozzle assembly of the present invention.
Figure 5:
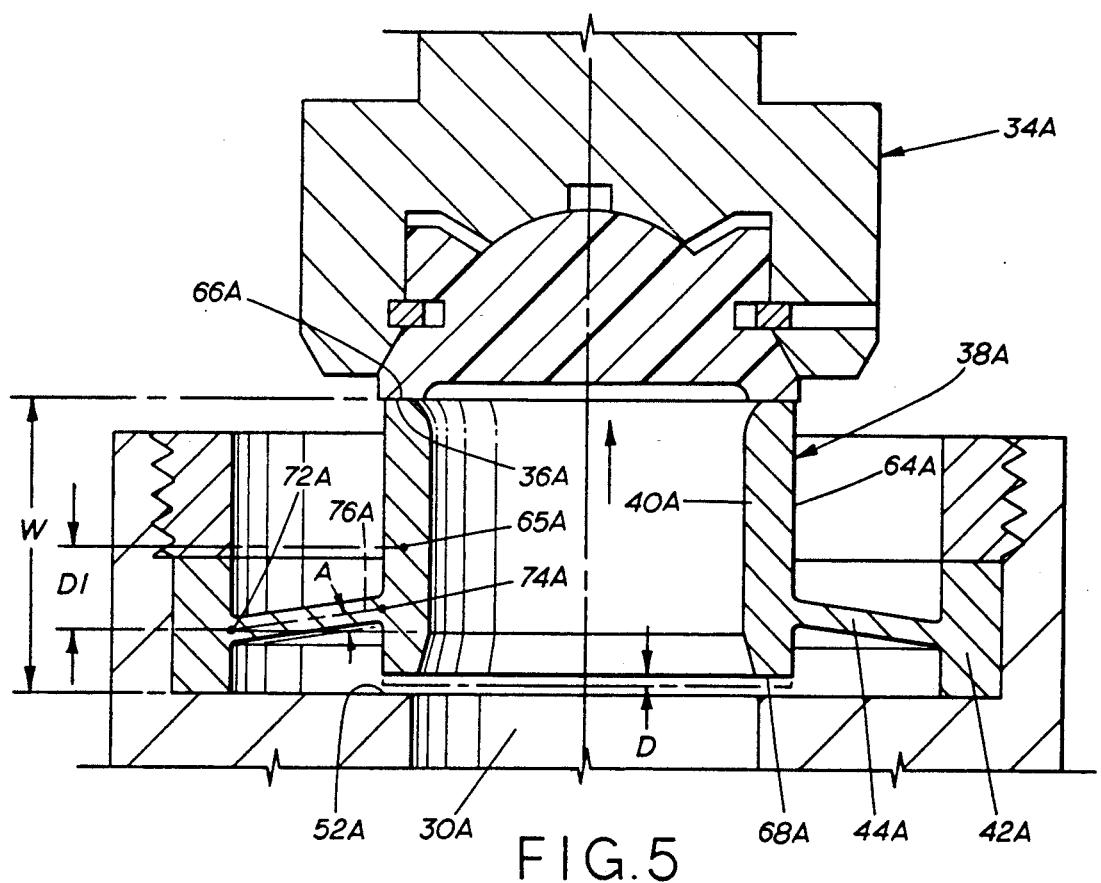
FIG. 5 is an enlarged fragment of FIG. 4 showing the shock absorbing sealing means of the present invention.

Referring now to FIGS. 4 and 5, another embodiment of the present invention is illustrated for a pressure relief valve indicated at 14A which is not pilot operated. Pressure relief valve 14A has a valve body 16A including an inlet flow passage 30A and an outlet flow passage 32A. A reciprocable valve member 34A has an annular seal face 36A and is urged into seating engagement by spring 37A.

Improved nozzle assembly 38A has an upper annular seat face 66A engaging seal face 36A on valve member 34A. Nozzle assembly 38A includes an inner seat ring 40A, an outer anchor ring 42A, and a flexible connecting member 44A extending in a generally radial direction between the outer periphery 64A of seat ring 40A and the inner periphery of anchor ring 42A. Upon a predetermined high fluid pressure being reached in inlet fluid passage 30A, valve member 34A and seal face 36A are forced outwardly against the bias of spring 37A to permit fluid flow through fluid passage 32A. Upon a reduction in fluid pressure in inlet 30A, valve member 34A under the bias of spring 37A moves nozzle assembly 38A to a reseated position on seat face 60A of seat ring 40A on nozzle assembly 38A.

Flexible connecting member or web 44A functions in the same manner as the embodiment of FIGS. 1–3 and is generally identical to the embodiment of FIGS. 1–3. The longitudinal axis 76A of connecting member 44A has a positive slope shown at angle A between hinge points 72A and 74A. Angle A is generally equal to angle A in the embodiment of FIGS. 1–3 and slopes downwardly from seat ring 40A toward anchor ring 42A as in the embodiment of FIGS. 1–3. Additionally, in order to minimize deflection of face 42A after contact against face 20A, the center of gravity 65A of seat member 40A is positioned forwardly of hinge point 72A toward face 66A as shown at D1. Distance D1 is generally identical to the distance D1 in the embodiment shown in FIGS. 1–3 thereby to minimize the deflection of face 66A resulting from the flexing of connecting member 44A. Seat ring 40A moves a distance D as in the embodiment of FIGS. 1–3 and rear face 68A of seat ring 40A engages shoulder 52A in abutting contact to limit the movement of seat ring 40A past the elastic limit of connecting member 44A.

While the present invention has been illustrated for utilization with pressure relief valves, it is to be understood that this invention could be utilized with other types of fluid flow control devices, such as pumps, check valves, and the like where a reciprocable flow control member is provided for seating and reseating against an annular seat ring. Thus, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. In a fluid operated valve having a body including a flow passage therethrough;
   a hard annular seat ring mounted within the valve body about the flow passage;
   a fluid pressure responsive reciprocable valve member mounted within the valve body for movement between open and closed positions relative to said flow passage and adapted to seat in closed position on said hard seat ring and to exert an impact force against said hard seat ring when seating thereon;
   a flexible connecting member having inner and outer peripheral portions with said inner peripheral portion being connected to said hard seat ring about the entire outer periphery of said seat ring and extending in a generally radial direction outwardly therefrom to said outer peripheral portion; and
   anchoring means connected to said outer peripheral portion of said flexible member to permit flexing of said connecting member after initial contact of said reciprocable valve member with said hard seat ring to absorb impact loads resulting from contact of said valve member against said hard seat ring, said flexible member flexing relative to said anchoring means upon impact of said valve member against said hard seat ring and axial movement of said hard seat ring resulting from such impact.

2. In a fluid operated valve as set forth in claim 1;
   said reciprocable member having a hard seal ring for sealing and seating against said seat ring in the closed position of the valve member, said seal ring and said seat ring having generally planar sealing faces in contact with each other in the closed position of said reciprocable valve member.

3. In a fluid operated valve as set forth in claim 1;
   said connecting member being slanted from said seat ring a predetermined amount in a direction at right angles to a radial direction to provide increased resistance to radial deflection of said seal ring after initial contact of said reciprocable valve member against said seat ring.

4. In a fluid operated valve as set forth in claim 3;
   said connecting member being hinged at opposed ends thereof to said seat ring and to said anchoring means thereby to permit axial movement of said hard seat ring upon impact of said valve member.

5. In a fluid operated valve as set forth in claim 3;
   said connecting member being slanted from said seat ring in a direction toward said reciprocable valve member with the center of gravity of said seat ring being positioned axially inwardly of said connecting member toward said valve member for minimizing radial deflection of the seat ring.

6. In a fluid operated valve as set forth in claim 1;
   said seat ring defining a nozzle and moving axially a distance between around 0.002 inch and 0.030 inch after initial contact of said reciprocable valve member with said seat ring to effect flexing of said connecting member.

7. In a fluid operated valve as set forth in claim 1;
said seat ring, said anchoring means, and said flexible connecting member being a one piece integral structure defining a nozzle assembly.

8. In a fluid operated valve as set forth in claim 1;
said seat ring having a width as measured in a direction parallel to the longitudinal axis of said valve member at least around three times the thickness of said connecting member, and having a thickness as measured in a direction transverse to the longitudinal axis of said valve member at least around twice the thickness of said connecting member.

9. In a fluid operated valve as set forth in claim 1 wherein said anchoring means includes an outer anchor ring integral with said connecting member; and
a sleeve threaded within said flow passage abuts said anchor ring to secure said anchor ring within said valve body.

10. In a flow control device having a body including a valve chamber and inlet and outlet flow passages in fluid communication with said valve chamber;
a reciprocable flow control valve member mounted within said valve chamber for movement between open and closed positions relative to said flow passages and having a seal face;
a nozzle assembly mounted in one of said flow passage adjacent said reciprocable flow control member, said nozzle assembly including an inner seat ring, a radially outer anchor member, and a flexible connecting member extending in a generally radial direction between said inner seat ring and said outer anchor member; said seal face on said valve member adapted to seat on said seat ring and to exert an impact against said seat ring when seating thereon;
said flexible connecting member flexing relative to said outer anchor member upon axial movement of said seat ring resulting from impact of said seal face on said valve member with said seat ring to absorb impact loads resulting from contact of said valve member against said seat ring; and
means on said valve body to secure said radially outer anchor member to said body.

11. In a flow control device as set forth in claim 10 wherein said radially outer anchor member comprises an anchor ring.

12. In a flow control device as set forth in claim 11 wherein said means on said valve to secure said radially outer anchor member to said body comprises an externally threaded sleeve threaded within said one flow passage and abutting said anchor ring for securing said anchor ring to said body.

13. In a flow control device as set forth in claim 10;
the maximum thickness of said seat ring as measured in a direction transverse to the longitudinal axis of said flow control valve member being at least around twice the thickness of said flexible connecting member.

14. In a flow control device as set forth in claim 10;
said nozzle assembly being an integral one piece construction.

15. In a flow control device as set forth in claim 10;
said seat ring having a width as measured in a direction parallel to the longitudinal axis of said flow control valve member at least around three times the thickness of said connecting member.

16. In a flow control device as set forth in claim 10;
said seat ring adapted for moving relative to said anchor member after contact of said seal face with said seat ring an amount at least around 0.002 inch; and
the maximum thickness of said seat ring as measured in a direction transverse to the longitudinal axis of said valve member is at least around twice the thickness of said connecting member.

* * * * *